April 28, 1953     D. W. FINLAY ET AL     2,636,457
COLLAPSIBLE TRUSS STRUCTURE
Filed Aug. 22, 1950     3 Sheets-Sheet 1
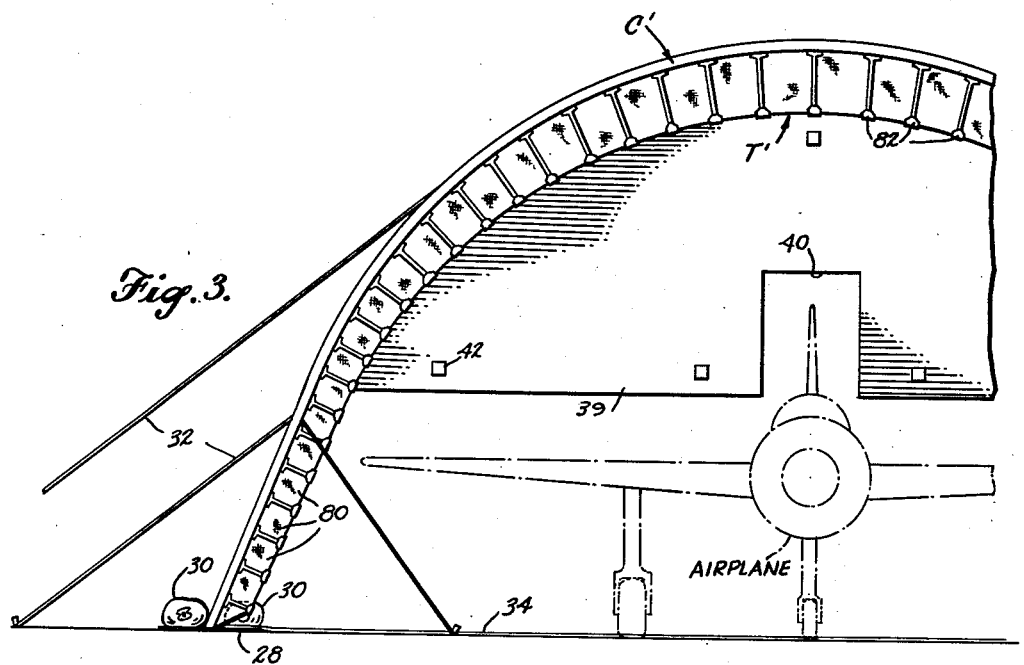
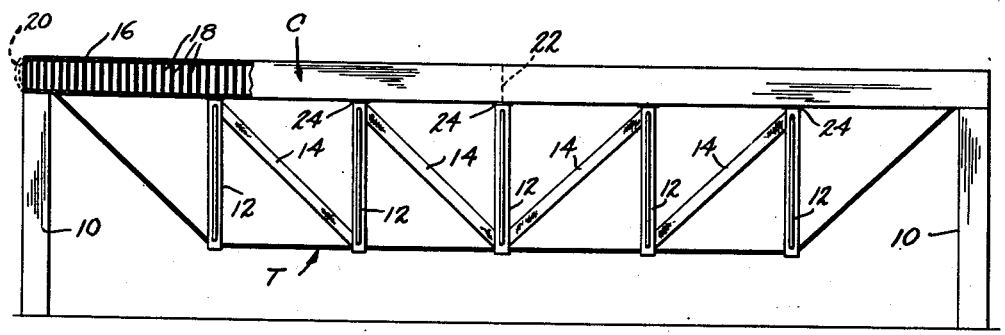
INVENTOR.
DONALD W. FINLAY
OTTO D. ROHLFS
BY
ATTORNEYS

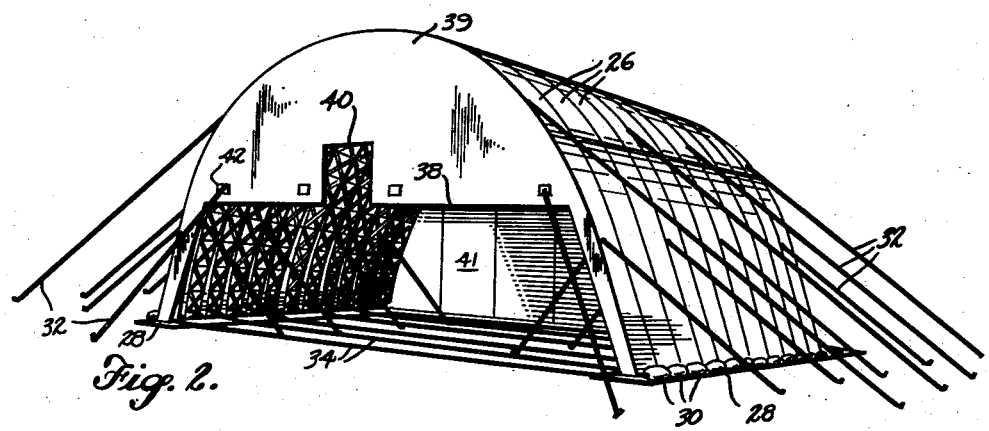
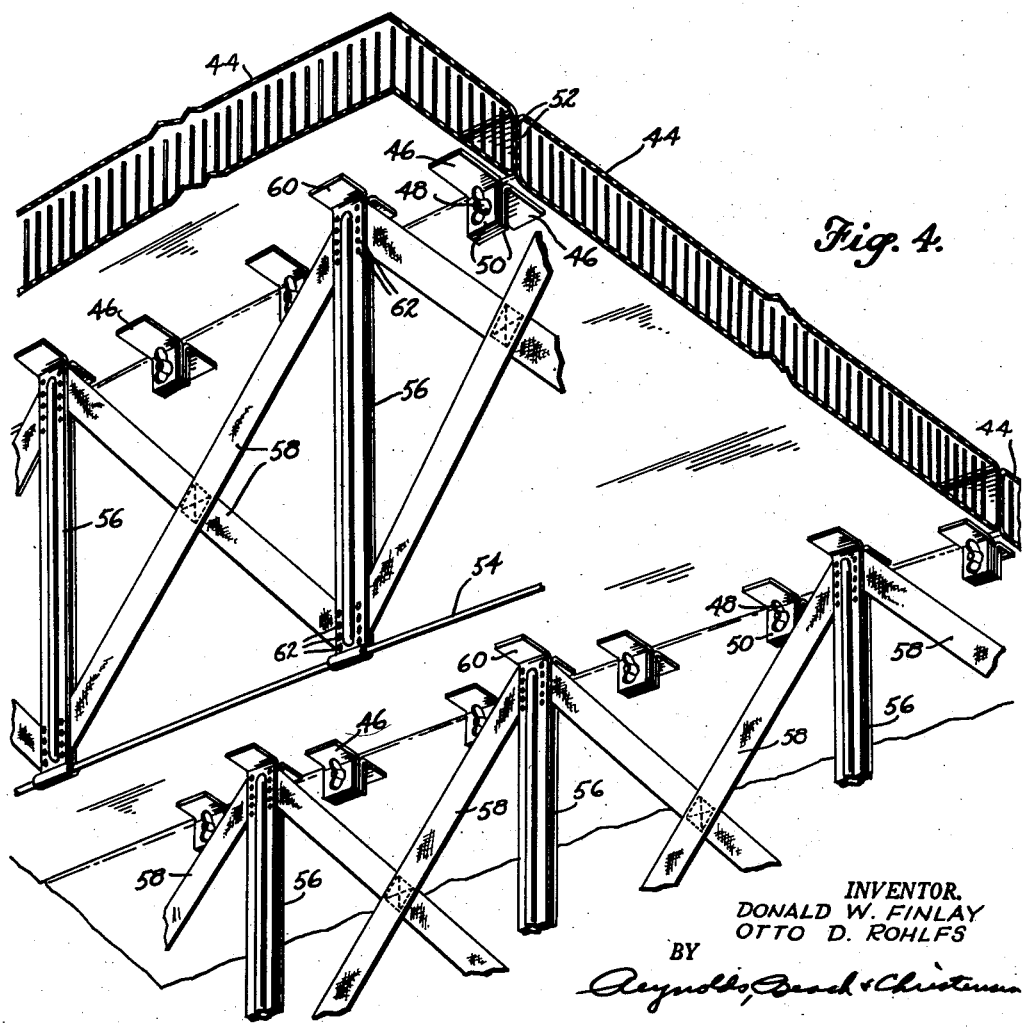

April 28, 1953  D. W. FINLAY ET AL  2,636,457
COLLAPSIBLE TRUSS STRUCTURE
Filed Aug. 22, 1950  3 Sheets-Sheet 3

INVENTOR.
DONALD W. FINLAY
OTTO D. ROHLFS
BY
Reynolds, Beach & Christensen
ATTORNEYS

Patented Apr. 28, 1953

2,636,457

UNITED STATES PATENT OFFICE 2,636,457

COLLAPSIBLE TRUSS STRUCTURE

Donald W. Finlay and Otto D. Rohlfs, Seattle, Wash., assignors to Boeing Airplane Company, Seattle, Wash., a corporation of Delaware Application August 22, 1950, Serial No. 180,876

12 Claims. (Cl. 108—23)

This invention relates to a lightweight collapsible truss structure and more specifically to a mobile collapsible shelter or the like embodying the same. The invention is herein illustratively described by reference to its preferred application, namely in aircraft mobile hangar constructions, but is also applicable to numerous other types of construction.

An object of the invention is a truss structure which is light and strong and can be collapsed readily into a highly compact mobile form. A related object is such a truss structure adapted to be collapsed and erected quickly, and incorporating a minimum number of detachable parts which might become lost or misplaced. In accordance with the invention the main compression member of the truss structure is a panel of such a size and shape as to function as a platform, cover or other surfacing, integral with the cooperating parts of the truss and yet be conveniently collapsible with such other parts into a compact lightweight bundle for mobility purposes.

A more specific object is a mobile collapsible shelter or the like possessing the further advantage of a self-sealing thermal insulating closure affording protection against all types of inclement weather conditions. Preferably the major surfaces of such a shelter exposed to the weather are of rubber or similar flexible nonmetallic material requiring little or no protective finishing to prevent deterioration. All structural parts of metal are preferably sheltered within the closure.

Described briefly and in general terms, the invention contemplates the use of a spanwise truss compression member comprising a generally panel-shaped pneumatic bag operatively disposed generally parallel to the neutral plane of the truss and inflated with compressed air to a pressure sufficient to create initial tension forces in its walls directed longitudinally of the truss in excess of compression forces produced therein when the truss is placed under maximum expected load. It has been found that even a normally flexible rubber wall bag will function efficiently as the major compression span member of a truss if this relationship between air pressure tension loading of the bag walls and maximum compression loading of such bag in its capacity as the spanwise-extending compression member of the truss is maintained.

Moreover, the compression member comprising one bag or a series of adjoining bags making up the span of the truss presents a continuous upper or outer cover which is advantageously used as a platform, as an insulating wall or for other and similar functions depending upon the nature of the structure in which the truss is used. Such a bag may be collapsed into very compact form when it is desired to move the structure.

The spanwise tension member or members of the truss interconnected by suitable struts and cross bracing with the pneumatic bag compression member may be of various types. Preferably, however, such tension member is constituted by a flexible tie member, such as a cable or the like, the advantage of which, in addition to its strength and light weight, is that it may be coiled or folded compactly when the structure is collapsed for any purpose.

The struts and cross bracing members in the truss likewise may vary both as to arrangement and form. Preferably, however, the struts are made of lightweight metal whereas the cross bracing extending diagonally between the struts comprises flexible tension elements of fabric or other flexible lightweight material which may be folded or arranged compactly when the structure is collapsed. In the preferred form of collapsible truss all the members remain interconnected in the collapsed condition of the unit in the same relationship as when unfolded for erection of the truss, though for convenience in stowage the truss may be removed from the bag if desired.

Further features of the invention reside in the collapsible mobile shelter construction, such as an aircraft hangar or the like, incorporating one or more truss units. Preferably a series of arched truss panels comprising collapsible pneumatic bag truss compression members of arcuate panel form are joined in edge-to-edge relationship to form a curved shelter roof and continuing side walls. The dead air space within the bags affords a high degree of thermal insulation, while pressure of contact between the adjoining bag edges forms a wind and moisture-tight seal. Depending trusswork carried by each bag folds compactly with such bag when the panel units are collapsed. Although the resulting structure is rigid and strong, guy lines may be employed for increasing its rigidity and for holding down the lightweight structure against displacement by winds.

Similar inflated truss panels may be used for airship components, boats, rafts, bridges and platforms. These and other objects, features and advantages of the invention including certain details of preferred constructions will become more fully evident from the following description based upon the accompanying drawings illustrating representative forms of the invention both in its general application and in aircraft hangar construction.

Figure 1 is a side elevation of an illustrative form of the truss structure employed as a bridge or roof truss, for example.

Figure 2 is a perspective view of a collapsible aircraft hangar constructed of a number of arched truss units in accordance with the invention.

Figure 3 is a front elevation of a portion of such a hangar incorporating a modified truss structure.

Figure 4 is a perspective view of an interior fragmentary portion of the hangar structure, illustrating structural details of the truss panel units and a preferred technique for interconnecting the same.

Figure 5:
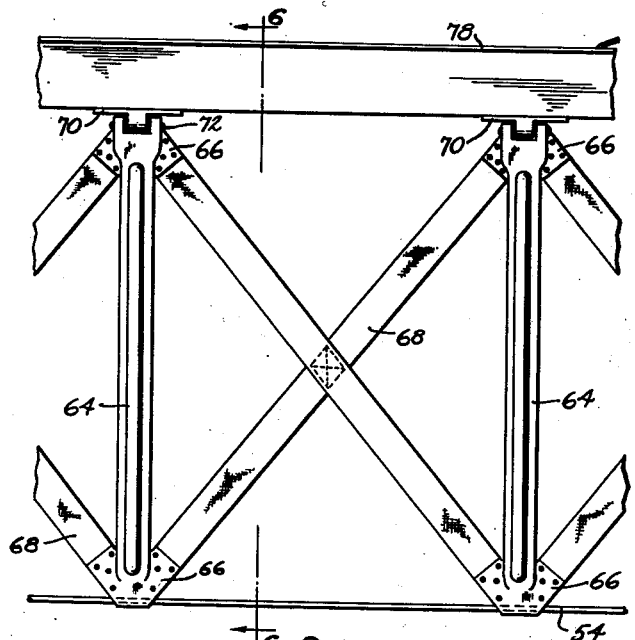
Figure 5 is a side elevation of a fragmentary portion of a truss unit of somewhat modified form and employing a different technique for interconnecting adjoining truss panel units.

As shown in Figure 1 the truss is of the inverted Howe type with parallel, straight chords. It will be understood, however, that the invention is applicable to various other types of truss forms as well. The truss shown in the figure could serve as a footbridge, for example, with the panel-shaped pneumatic bag truss compression member C functioning as the bridge platform, covered by a separate tread surface, or uncovered, as may be desired, or as a roof truss with such pneumatic bag compression member serving as the roof cover or sheathing, as another example.

The ends of the pneumatic bag compression member C, which in this case is preferably a flexible fabric reinforced rubber bag of generally rectangular panel form, rest on piers or footings 10 with the body of the truss bridging between such footings. The main tension member T of the span preferably comprises a flexible steel cable or the like, the major portion of which is maintained at the desired spacing beneath the compression member C by short struts 12 spaced at intervals along the span. The web diagonals 14, preferably of fabric webbing, interconnect opposite ends of alternate struts as shown, to provide diagonal bracing completing the general truss structure.

The principal feature of the invention resides in the use of the inflatable flexible walled bag 16 or series of interconnected adjoining bags as the principal compression member or upper chord of the truss. A commercially available bag suitable for this purpose is manufactured by the Goodyear Tire & Rubber Co. of Akron, Ohio. This bag, as shown sectionally in the left portion of Figure 1, comprises a casing of rubber or rubberlike material with fabric reinforcing. To the fabric of the casing walls are secured flexible cords or stays 18, serving to limit the maximum spacing of the opposite, upper and lower, major walls of the bag as internal air pressure is increased during inflation of the bag.

Usually no special stiffeners are employed in the side and end walls, which because of their relatively narrow dimension do not tend to bulge excessively, although as internal pressure is increased in the bag these side and end walls will bulge out somewhat as shown by the dotted line 20. However, the effect of this bulging tendency is in no way detrimental. In fact, when two or more bags are arranged and interconnected in edge-to-edge relationship to make up a composite truss structure, this tendency of their adjoining narrow walls to bulge outward under pressure produces a tightly sealed leak-proof joint between them. The dotted line 22 represents the location of the joint between bags where two are used in the span, for example.

The thickness of the inflated bag 16 in the ordinary case is not critical, four inches being a typical spacing between the upper and lower walls. The length and width dimensions of an individual bag likewise may vary in accordance with choice or design. In the case of a bridge application of the truss shown in Figure 1, for example, the desired width of the bridge platform will control the width of the bag or bags in the direction of width of the bridge, it being understood that the platform may be formed of a single bag unit or by a number of such units joined together in rows either or both widthwise and lengthwise of the bridge.

The controlling factor in the use of this type of bag as the compression-loaded chord member of the truss is its ability to withstand buckling under compression as long as the longitudinal compressive loading of the longitudinal walls of the bag attributable to external and tare loading of the truss does not become equal to or exceed the longitudinal tension stress in such walls resulting from internal air pressure. In terms of actual stresses in the longitudinal walls of the bag, these flexible walls will not tend to buckle as long as they remain under actual tension, and it will be obvious that they remain under tension until loading of the truss has increased to the point at which the compressive force acting on the bag balances and exceeds the inherent tension in its longitudinal walls created by air pressure within the bag. Until this balance point is reached, such walls remain loaded in tension and there is, therefore, no tendency for them to buckle.

If in the illustrated case the bag or bags constitute a bridge platform, it will usually be preferable to lay suitable sheet decking over the top of the bags so that a more rigid tread surface is provided. However, in applications of the truss where the bag as a supporting surface would not be subjected to heavy concentrated loads, no additional or separate covering may be necessary. If in Figure 1 the truss represents a roof truss, for example, no additional outer covering may be necessary, and although a number of bags may be employed in the entire structure, it will not even be necessary to specially seal the joints between the bags, because of the inherent self-sealing property of the joint resulting from pressure of contact between the adjoining surfaces, both of which tend to bulge outward toward each other under internal pressure.

In a preferred case, the struts 12 in the truss web may be manufactured of lightweight stiff material such as aluminum, formed into a suitable stiffened shape, whereas the diagonal ties 14 may be of a fabric material riveted or otherwise secured to the ends of the aluminum struts. The lower tension chord cable T is suitably connected by its ends to the respective ends of the bag compression chord member C and to the lower ends of the struts 12. The upper ends of the struts have footings 24 suitably bonded or otherwise fastened to the lower wall of the bag. The entire structure may be collapsed and folded accordion fashion or rolled into a compact mobile package taking any of a variety of shapes, by deflating the bag or bags 16 and folding them together with the web's bundle of struts 12 and diagonals 14, and with the coils of cable T. When the truss structure is to be reassembled, it may be unfolded quickly, and by spreading out the interconnected elements and inflating the bag or bags can be erected on short notice. As a military or civilian device for field operations such a truss structure has a number of important uses, some of which are mentioned herein.

Further and more specific features of the invention reside in the aircraft collapsible mobile hangar construction illustrated generally in Figures 2 and 3. Such a hangar is particularly suited to the housing of individual fighter airplanes as shown in Figure 3 although, if desired, the hangar can be made in larger sizes.

A continuously curved shelter roof resembling the Quonset hut form is erected by joining together a series of arched beams integral with roof panel sections 26 separately erected and then connected in the structure until the desired length of the hangar closure is attained. Ground-engaging flaps 28 or the like fastened to the lower ends of the panel units 26 are held down suitably, such as by piling sand bags 30 on such flaps to hold the hangar structure in fixed position against the displacing forces of wind, for example. A number of anchor or guy ropes 32 connected to ground stakes may also be employed for holding the structure in fixed position, as shown. Ground cables 34 interconnecting the opposite foot portions of the panels add further stiffness to the composite structure.

Suitable front and rear end walls 39 and 41 completing the closure may be of heavy canvas formed in sections and suitably connected together, for example, or of inflatable pneumatic bags similar to the type employed in the roof structure, or of still other construction preferably of a collapsible, lightweight nature. In the illustrated case, the hangar entrance 38 includes a central notch 40 formed in the fixed upper end wall portion 39 to admit the tail structure of the aircraft. Anchor rings 42 fastened to the lower edge portion of the fixed front wall and at similar locations on the back wall 41 are provided for attachment of additional guy ropes fastened to the ground stakes where desired.

Figure 4 illustrates the details of construction of the individual panel and truss units and a suitable technique for interconnecting adjacent units. Each such unit preferably comprises a single pneumatic bag 44 constructed so that it will naturally assume the desired arched form upon inflation to the normal pressure of the bag. At corresponding interval locations along opposite edges of such pneumatic bags fastening elements 46, such as the angle brackets shown, are bonded to the inner of the two major walls of the bag. When the structure is erected, the pneumatic bag truss compression chord and panel is inflated at least partially with the unit lying on the ground and inflation of the unit is thereafter completed and it is raised into erect position, preferably after being connected to adjacent units. As each such unit is brought into adjoining relationship with the unit preceding it, the angle brackets 46 of each pair are interconnected by a bolt and wing nut 48. When these joints are tightened, the abutting edges of the adjoining pneumatic bags are held close together so that, as the side edges tend to bulge because of the bag inflation, the pressure of contact between such abutting walls held substantially flat establishes a moisture-tight seal between the bags.

Each roof panel truss in the illustrative case is composed of the arched pneumatic bag 44 as the compression chord and a single cable as the tension chord 54 interconnected by the web including a series of metal struts 56 and fabric webbing crossed diagonals 58. Moreover, to enable the several components to be folded together with maximum compactness, such components of each truss web depending structure, including the struts, diagonals and cable chord, are fastened to the bag along one of its side edges rather than in the middle, for example. It will be understood, however, that the location of such truss web widthwise of the bag, or the number of such truss webs associated with a single bag is to a large extent a matter of choice or design.

While various ways of securing the upper ends of the struts 56 to the inner wall of the bag may be employed, a preferred technique, as illustrated in Figure 4, is to provide outturned flanges 60 on the upper ends of such struts as footings to which the bag wall is bonded. These struts in their illustrated form comprise two parallel strips of aluminum or other lightweight metal stiffened by being bent to form a reinforcing rib extending substantially the full length of each such strip. At their upper and lower ends the strips are secured together by rivets 62 which pass through the interposed ends of the fabric diagonals 58, as illustrated. The lower end of one of the strips is extended beyond that of the other and curled around the cable 54 to provide a secure fastening to such cable.

Figure 6:
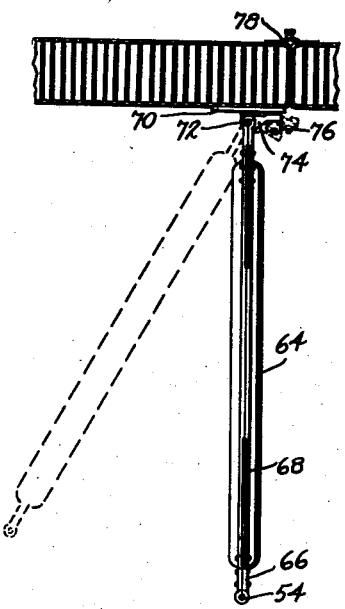
Figure 6 is a transverse sectional view taken on line 6—6 in Figure 5.

In the modified form of truss web shown in Figures 5 and 6, the upper and lower ends of the columns 64 are formed with gusset plates 66 between which the ends of the webbing cords 68 are received and fastened by rivets or other suitable fastenings. The upper ends of the struts 64 are hinged on mounting plates 70 bonded to the inner wall of the bag as shown, so that they may be folded flat against the bag to enable the entire assembly to be rolled into a package. In the erected condition of the unit each hinged strut 64 is locked in perpendicular relationship to the general plane of the associated bag by a lateral arm or lug 74 integral with the upper end of such strut and held against the mounting plate 70 by a nut on a bolt 76, pivoted on the mounting and swingable from its dotted line position shown in Figure 6 to its solid line position in which such bolt enters a slot in the arm 74.

Another modification of the truss and panel structure, shown in Figures 5 and 6, incorporates a separable slide fastener 78 affording a quickly engageable connection extending continuously along the entire length of the outer adjoining corners of adjacent bags as shown.

Figure 7:
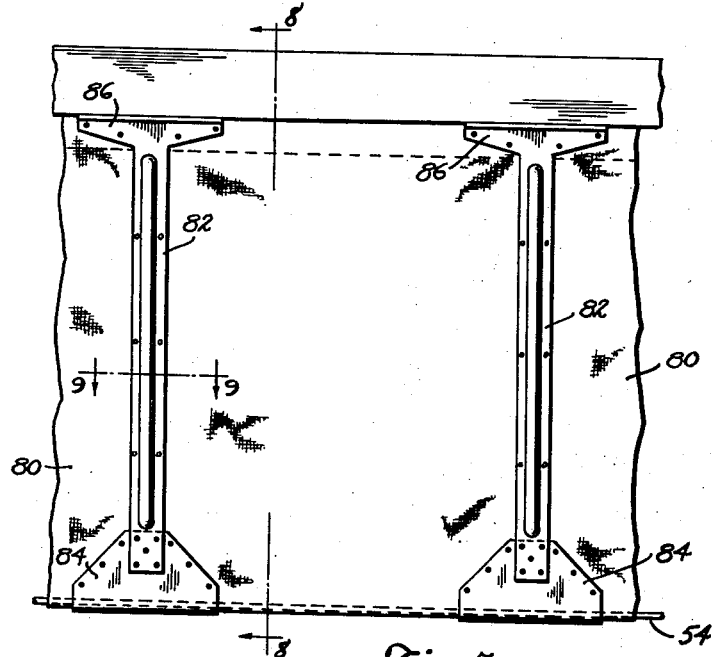
Figure 7 is an elevation view corresponding to Figure 5 but illustrating a further modification of the truss structure.
Figure 8:
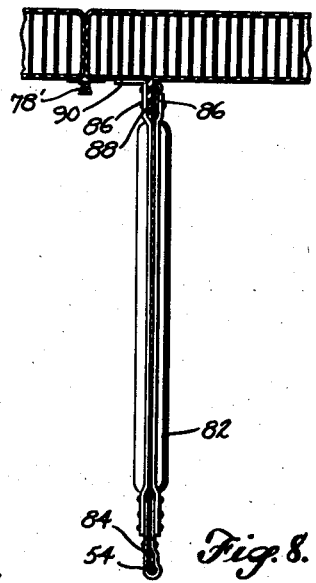
Figure 8 is a transverse sectional view taken on line 8—8 in Figure 7.
Figure 9:
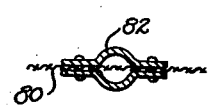
Figure 9 is a sectional detail view taken on line 9—9 in Figure 7.

In the further modification of Figures 7, 8 and 9, illustrating the type of truss used in the hangar of Figure 3, the slide fastener 78' is located at the inside of the joint between bags instead of at the outside of the joint. Instead of by diagonals of webbing the struts 82 are interconnected by a continuous canvas sheet 80 clamped between the opposite side plates of the composite struts in the manner illustrated. The cable forming the tension chord of the truss is received in a marginal hem of the canvas sheet and clamped in the base of channel-shaped gussets 84 on the struts. The upper end of each strut 82 is secured to the bag by the provision of spaced clamping elements 86 between which a heavy rubber flap fixed to the bag and depending from it is held by rivets or other suitable fastenings. In addition, an outturned flange 90 on one of the clamping elements 86 may be bonded to the bag for adding strength to the column connection.

We claim as our invention:

1. A truss structure comprising a generally elongated compression chord member formed of pneumatic bag means having flexible spanwise walls in themselves inherently incapable of resisting buckling under compressive stress imposed thereon by appreciable normal truss loading, but stressed initially in tension by inflation of the bag means to such a pressure that such tension exceeds the compressive loads imposed thereon by expected or normal loading of the truss, and generally elongated truss web means cooperating with said pneumatic bag truss compression member, said truss web means comprising an elongated tension member interconnecting opposite end portions of said pneumatic bag means, and transverse spacer means interposed, and establishing a material spacing, between said pneumatic bag means and tension member intermediate the ends thereof.

2. The truss structure defined in claim 1, wherein the pneumatic bag means comprises a generally elongated deflatable and collapsible bag which is relatively thin and has considerable width in a plane generally perpendicular to the web of the truss means to constitute a panel, and means limiting the thickness of the bag substantially uniformly over the length and width thereof.

3. The truss structure defined in claim 2, wherein the tension member comprises a flexible cable and the transverse spacer means comprises a plurality of compression struts interengaged between the bag and such cable at intervals therealong, and fabric means interconnecting said struts.

4. The truss structure defined in claim 3, wherein the fabric means includes diagonal tension members of webbing material.

5. The truss structure defined in claim 4, wherein the diagonal tension members are crossed between alternately opposite ends of adjacent struts.

6. Trusswork comprising a plurality of similar individual truss structures each comprising a generally elongated compression chord member formed of pneumatic bag means having flexible spanwise walls in themselves inherently incapable of resisting buckling under compressive stress imposed thereon by appreciable normal truss loading, but stressed initially in tension by inflation of the bag means to such a pressure that such tension exceeds the compressive loads imposed thereon by expected or normal loading of the truss, and generally elongated truss web means cooperating with said pneumatic bag truss compression member, said truss web means comprising an elongated tension member interconnecting opposite end portions of said pneumatic bag means, and transverse spacer means interposed, and establishing a material spacing, between said pneumatic bag means and tension member intermediate the ends thereof, the pneumatic bags being secured together in series, longitudinal edge to longitudinal edge, abutting relationship to form a composite panel-like trusswork compression chord member, pneumatic pressure in such bags producing a mutually opposing bulging tendency of abutting bag walls thus secured together by their edges and creating a pressure-tight contact therebetween.

7. Trusswork as defined in claim 6, wherein the transverse spacer means of the individual truss structures comprise a plurality of compression struts interengaged between the bag and the cable at intervals therealong, and separate flexible means interconnecting the struts of each individual truss structure.

8. Trusswork as defined in claim 7, wherein the flexible means interconnecting the struts comprise diagonally disposed fabric strips.

9. A truss structure comprising a generally elongated compression chord member formed of pneumatic bag means having flexible spanwise walls in themselves inherently incapable of resisting buckling under compressive stress imposed thereon by appreciable normal truss loading, but stressed initially in tension by inflation of the bag means to such a pressure that such tension exceeds the compressive loads imposed thereon by expected or normal loading of the truss, and generally elongated truss web means cooperating with said pneumatic bag truss compression member, said truss web means comprising an elongated tension member interconnecting opposite end portions of said pneumatic bag means, and transverse spacer means interposed, and establishing a material spacing, between said pneumatic bag means and tension member intermediate the ends thereof, and means hingedly connecting said transverse spacer means to the bag to permit swinging thereof into stored position alongside the bag upon deflation of such bag.

10. The truss structure defined in claim 9, wherein the tension member comprises a flexible cable and the transverse spacer means comprises a plurality of compression struts interengaged between the bag and such cable at intervals therealong, and fabric means interconnecting said struts, said struts being hingedly connected to the bag.

11. The truss structure defined in claim 10, wherein the fabric means interconnecting the struts comprises a continuous fabric sheet bridging between the cable and the bag.

12. The trusswork defined in claim 11, wherein the individual struts comprise generally similar elongated rigid strips placed on opposite sides of the fabric sheet and secured together through the fabric.

DONALD W. FINLAY.
OTTO D. ROHLFS.

References Cited in the file of this patent

UNITED STATES PATENTS

| Number | Name | Date |
|---|---|---|
| 511,472 | Sumovski | Dec. 26, 1893 |
| 2,323,106 | Whiteman | June 29, 1943 |
| 2,333,136 | Wolfard | Nov. 2, 1943 |
| 2,352,526 | Farrand | June 27, 1944 |
| 2,411,316 | Capita | Nov. 19, 1946 |
| 2,477,394 | Spiker | July 26, 1949 |
| 2,494,680 | Wiley | Jan. 17, 1950 |

FOREIGN PATENTS

| Number | Country | Date |
|---|---|---|
| 709,532 | France | of 1931 |